3,215,692
N-(AMINOALKYL) - 2 - ALKOXY - PHENOXAZINES AND A METHOD OF MAKING N-(AMINOALKYL)-PHENOXAZINE DERIVATIVES
Guido Eros Bonvicino, Pearl River, N.Y., and Robert Allis Hardy, Jr., Ridgewood, and Lawrence Henry Yogodzinski, Hillsdale, N.J., assignors to American Cyanamid Company, New York, N.Y., a corporation of Maine
No Drawing. Filed Oct. 25, 1961, Ser. No. 147,464
3 Claims. (Cl. 260—244)

This application is a continuation-in-part of our copending application Serial No. 832,175, filed August 7, 1959, now abandoned.

This invention relates to certain N-(aminoalkyl)-2-alkoxy-phenoxazines and to a novel method of preparing substituted N - (aminoalkyl) - phenoxazine derivatives. More particularly, the invention is concerned with novel compounds which may be represented by the following general formula:

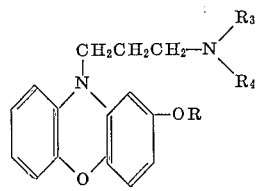

wherein R is lower alkyl and

is dimethylamino or N-methylpiperazino. Suitable lower alkyl groups are, for example, methyl, ethyl, n-propyl, iso-propyl, n-butyl, etc. More particularly, the novel method of the present invention consists in first rearranging an N-[2-(o - halophenoxy)phenyl] - N',N' - disubstituted-alkylenediamine to the corresponding 2-[o-halo-N-(disubstituted-aminoalkyl)anilino]phenol which is then ring-closed to the corresponding N-(disubstituted-aminoalkyl)-phenoxazine. The novel process of the present invention proceeds as follows:

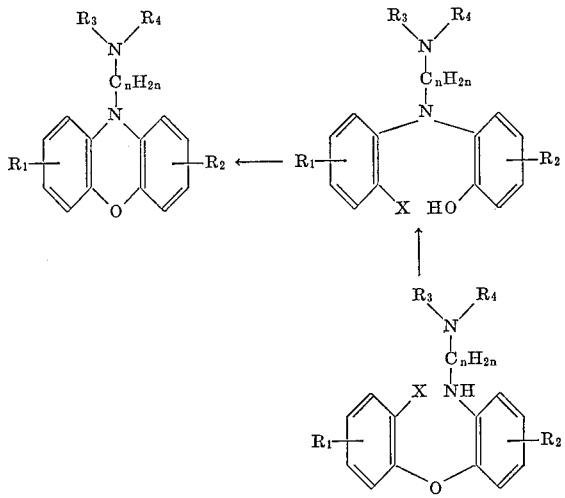

wherein $R_1$ and $R_2$ are each hydrogen, halogen, lower alkyl lower alkoxy or trifluoromethyl with the proviso that $R_1$ and $R_2$ cannot both be hydrogen;

is di(lower alkyl)-amino, N-methylpiperazino, piperidino, morpholino or pyrrolidino; X is reactive halogen and $n$ is an integer greater than 1 and less than 5. Suitable lower alkyl groups are methyl, ethyl, n-propyl, iso-propyl, N-butyl, etc. Suitable lower alkoxy substituents are, for example, methoxy, ethoxy, n-propoxy, iso-propoxy, etc. Reactive halogen is exemplified by chlorine and bromine.

The novel N-(amnioalkyl)-2-alkoxy-phenoxazines of the present invention form non-toxic acid addition and quaternary ammonium salts with a variety of organic and inorganic salt forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and related acids. For purposes of this invention the free bases are equivalent to their non-toxic acid-addition salts.

The novel compounds of the present invention are, in general, white crystalline solids. They are generally insoluble in water, but relatively soluble in organic solvents such as lower alkanols, esters, ethers, ketones, benzene, toluene, chloroform, and the like. The acid-addition salts of the organic bases of the present invention are, in general, crystalline solids, relatively soluble in water, methanol and ethanol, but relatively insoluble in non-polar organic solvents such as ether, benzene, toluene and the like.

The novel compounds of the present invention are central nervous system depressants of the tranquilizer or tranquilizer-muscle relaxant type. Upon administration they produce a sedative action with few side effects and are particularly valuable (in contrast to the more potent tranquilizing drugs) in mild cases of mental and emotional upset as well as somatic disorders requiring relaxant agents with little danger of serious side effects. The dosage required to produce the aforementioned effect varies between about 50 mg. and 500 mg. per individual dose. The dosage regimen may be adjusted to provide the optimum therapeutic response. For example, several doses may be administered daily or the dose may be proportionately reduced as indicated by the exigencies of the therapeutic situation.

The novel process of the present invention provides an important new method for the preparation of substituted N-(aminoalkyl)-phenoxazines which are well-known as useful tranquillizing agents and which have been described in U.S. Patents 2,947,745 and 2,947,747 to Craig, and by Olmstead et al., J. Org. Chem., 26, 1901 (1961), and by Bonvicino et al., J. Org. Chem., 26, 2797 (1961). The novel process of the present invention is particularly advantageous in that very high yields of the desired N-(aminoalkyl)-phenoxazines are obtained in an excellent state of purity by the ring closure of an appropriately substituted 2 - [o - halo-N-(disubstituted-aminoalkyl)anilino]phenol.

The ring closure of the anilinophenol derivative is achieved by treatment with a basic condensing agent and a metal catalyst in an inert organic solvent. Suitable basic condensing agents are the alkali or alkaline earth carbonates such as sodium carbonate, potassium carbonate, lithium carbonate, magnesium carbonate, and the like. Suitable metal catalysts are transition metals such as copper, silver, nickel, zinc, and the like. Copper powder is particularly useful and copper salts such as copper sulfate, cupric acetate, and the like are also suitable. The inert organic solvent is not critical but is conveniently used as a diluent. High boiling solvents in which the reactants are at least partially soluble are particularly desirable. Suitable solvents include dimethylformamide, diethylformamide, diethylacetamide, ethylene glycol dimethylether, and the like. The ring closure is generally carried out at an elevated temperature, conveniently the refluxing temperature of the solvent. Temperatures of from 125° C. to 200° C. are suitable but the preferred temperature range is from about 140° C. to about 150° C. Heating is continued until the reaction is substantially complete, generally from about 24 to about 48 hours. The reaction product may be readily obtained simply by evaporation of the inert organic solvent. When the solvent is water-soluble, such is dimethylformamide, a particularly useful technique is dilution of the reaction mixture with a large excess of water followed by extraction of the reaction product into ether. Evaporation of the ether extract gives the desired phenoxazine base in excellent yield and a good state of purity. Further purification of the phenoxazine base may be achieved by distillation under reduced pressure or by the recrystallization of acid addition salts of the base.

It is a particular advantage of the present invention that a wide variety of substituents on the aromatic rings may be employed. Many previous phenoxazine syntheses have been limited by the need for special activating groups or are just not applicable for certain classes of substituents on the aromatic rings. For example, the methods described by Craig in U.S. Patents 2,947,745 and 2,947,747 cannot be employed for nuclear lower alkoxy substituents. Such compounds, however, are readily prepared by the novel process of the present invention.

Another advantage of the novel process of the present invention resides in the fact that special blocking groups on the oxazine nitrogen atom are not required during the ring closure. Heretofore, a number of phenoxazine syntheses have required the introduction of blocking groups on the oxazine nitrogen atom in order to achieve good results during the ring closure. These blocking groups must necessarily be removed before the phenoxazine derivative may be converted to the desired N-(aminoalkyl)-phenoxazine. Thus, the novel ring closure of the present invention is widely applicable to a variety of nuclear substitutents without the necessity of introducing and subsequently removing or altering extraneous blocking or activating groups.

The appropriately substituted 2-[O-halo-N-(di-substituted-aminoalkyl)anilino]phenols, employed as starting materials in the ring closure step, are obtained in good yields and in an excellent state of purity by the novel rearrangement of the corresponding N-[2-(o-halophenoxy)phenyl]-N', N'-disubstituted-alkylenediamines. The rearrangement of the halophenoxyphenyl alkylenediamine derivatives is achieved by treatment, in an inert organic solvent, with a base capable of forming a nitrogen anion. Suitable bases for effecting the rearrangement include sodium, potassium, and lithium amides, sodium hydride, butyl lithium, dimethyl magnesium and the like. At least one molecular equivalent of the base forming reagent is employed. The inert organic solvent is not critical and solvents such as benzene, toluene, xylene, and the like may be used. Rearrangement is conveniently carried out at the refluxing temperature of the solvent. Temperatures of from 25° C. to 150° C. are suitable but the preferred temperature range is from about 75° C. to about 120° C. Heating is continued until the rearrangement is substantially complete, generally from about 6 to about 24 hours. The rearrangement products are readily isolated from the reaction mixture as phenolate salts which, in some cases, precipitate directly from the reaction mixture in a good state of purity. The anilinophenols may be readily obtained from their phenolate salts simply by trituration with water. They form acid addition salts and may be characterized and purified in this manner.

A further advantage of this novel rearrangement of the present invention resides in the fact that it may be carried out either with N-[2-(o-halophenoxy)phenyl]-N', N'-disubstituted-alkenediamines or with products which are prepared in situ. By this variation, appropriately substituted O-halophenoxyanilines are treated with an appropriate N,N-disubstituted-aminoalkyl halide and an excess (two molecular equivalents or more) of the basic condensing agent under the conditions described above whereby the corresponding anilinophenols are obtained directly in good yields. This eliminates the necessity of isolation of intermediate compounds and facilitates the ultimate obtention of the end products, the N-(aminoalkyl)-phenoxazine derivatives, by a practical and economically feasible series of steps. This variant of the rearrangement step and the preparation of the necessary intermediates is set forth in the following reaction scheme:

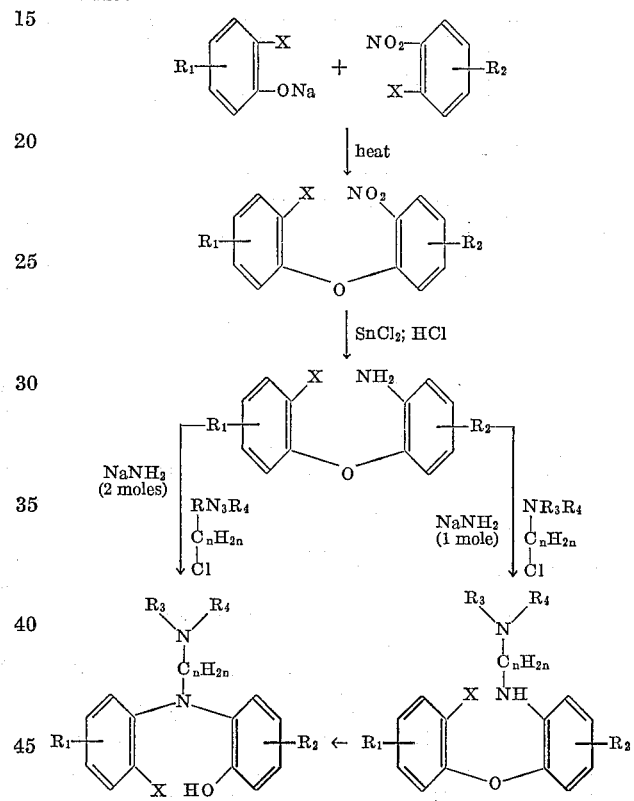

This reaction scheme shows the most economical products; for example, the phenolates are shown as sodium phenolates and the disubstituted-aminoalkyl halides as the chlorides. This is no sense necessary as the potassium phenolates are just as effective and othed disubstituted-aminoalkyl halides such as the bromides may be employed. However, because the more expensive products do not present any advantages, the sodio and chloro compounds are preferable. In similar manner, sodamide may be replaced by potassium amide but as there is no advantage and the cost is higher, we prefer to use the cheaper material and have so illustrated in the reaction scheme.

Insofar as the preparation of the intermediates is concerned, the various reactions present the usual problems of organic chemical synthesis. They are best carried out in inert reaction media and for this purpose typical organic liquids such as ether, lower alkanols, benzene, dimethylformamide, and the like are useful and are illustrated in the specific examples below. The invention is, of course, not limited to the use of these particular reaction media and other reaction media having satisfactory inertness, solvent characteristics, and boiling points may be used. Thus, for example, toluene may replace benzene, isopropanol may replace ethanol, etc. Similarly some of the steps are carried out at elevated temperatures. The examples set forth the preferred temperature or temperature range in each case. The examples also include various standard purification processes, such as recrystallization from well-known recrystallizing solvents. They are intended to be illustrative only and other solvent systems may be employed.

The invention will now be described in greater detail in conjunction with the following specific examples in which the parts are by weight unless otherwise specified.

*Example 1.—o-Halophenyl-2-nitrophenyl ether derivatives*

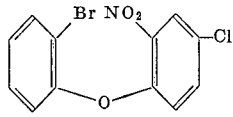

A solution of 10.8 g. (0.2 mole) of sodium methylate, 34.6 g. (0.2 mole) of o-bromophenol and 38.8 g. (0.2 mole) of 1,4-dichloro-2-nitrobenzene in 200 ml. of ethanol is evaporated to dryness in vacuo on a steam bath. The residue is heated at 160–165° C. for two hours and cooled. The product is suspended in 200 ml. of 10% sodium hydroxide and extracted with ether. The ethereal extract is dried over anhydrous magnesium sulfate and evaporated to dryness. The residue is exaustively extracted with boiling petroleum-ether (B.P. 90–100° C.). The crystalline product separates from the petroleum ether extract on cooling, is collected and recrystallized from ethyl acetate-petroleum ether. The product is o-bromophenyl-4-chloro-2-nitrophenyl ether.

The procedure of the above example is repeated with other reactants, in each case using the stoichiometric equivalent. The reactants and resulting products are shown in the following table:

TABLE I

| Starting Materials | | Products |
|---|---|---|
| o-Bromophenol | 4-chloro-3-nitro-α,α,α-trifluorotoluene. | o-Bromophenyl-α,α,α-trifluoro-2-nitro-p-tolyl ether. |
| o-Bromophenol | 4-chloro-3-nitroanisole. | o-Bromophenyl-4-methoxy-2-nitrophenyl ether. |
| o-Bromophenol | 4-chloro-3-nitrotoluene. | o-Bromophenyl-2-nitro-p-tolyl ether. |
| o-Bromophenol | 2,4-dichloronitrobenzene. | o-Bromophenyl-5-chloro-2-nitrophenyl ether. |

*Example 2.—2-(o-halophenoxy)aniline derivatives*

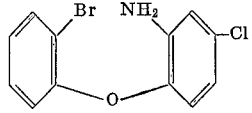

A mixture of 6.6 g. (0.02 mole) of o-bromophenyl-4-chloro-2-nitrophenyl ether and 18.1 g. (0.02 mole) of stannous chloride dihydrate in 200 ml. of ether under reflux and stirring is treated with a slow stream of anhydrous hydrogen chloride for three hours. The reaction mixture is evaporated to dryness, suspended in a 150–200 ml. mixture of water and ice and made strongly alkaline with 40% sodium hydroxide until the precipitated inorganic bases redissolve. The cooled reaction mixture is extracted with ether. The ethereal extract is washed with water until the washings are no longer alkaline. It is dried over anhydrous magnesium sulfate, evaporated to dryness, and the residue distilled under reduced pressure. The product, 2-(o-bromophenoxy)-5-chloroaniline, is collected and converted to the hydrochloride salt in ether by the addition of anhydrous hydrogen chloride. The product is then purified by recrystallization from an alcohol-ether mixture.

The above procedure is repeated with other starting materials, prepared by the method of Example 1, in each case using the stoichiometric equivalent. The starting materials and products are shown in the following table:

TABLE II

| Starting Materials | Products |
|---|---|
| o-Bromophenyl-α,α,α-trifluoro-2-nitro-p-tolyl ether. | 6-(o-Bromophenoxy)-α,α,α-trifluoro-m-toluidine. |
| o-Bromophenyl-4-methoxy-2-nitrophenyl ether. | 6-(o-Bromophenoxy)-m-anisidine. |
| o-Bromophenyl-2-nitro-p-tolyl ether. | 6-(o-Bromophenoxy)-m-toluidine. |
| o-Bromophenyl-5-chloro-2-nitrophenyl ether. | 2-(o-Bromophenoxy)-4-chloroaniline. |

*Example 3.—N'-[2-o-halophenoxy)phenyl]-N,N-disubstituted-1,3-propanediamines*

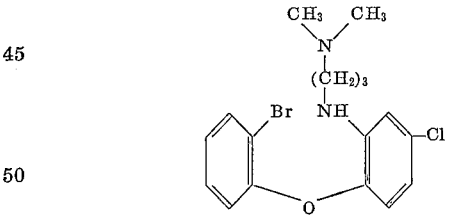

TABLE III

| Starting Materials | | Products |
|---|---|---|
| 2-(o-bromophenoxy)-5-chloroaniline. | 1-(3-chloropropyl)-4-methylpiperazine. | 1-{3-[2-(o-bromophenoxy)-5-chloroanilino]-propyl}-4-methylpiperazine. |
| 2-(o-bromophenoxy)-4-chloroaniline. | 3-chloro-N,N-dimethyl-propylamine. | N'-[2-(o-bromophenoxy)-4-chlorophenyl]-N,N-dimethyl-1,3-propanediamine. |
| o-(2,4-dibromophenoxy)-aniline. | 3-chloro-N,N-dimethyl-propylamine. | N'-[o-(2,4-dibromophenoxy)phenyl]-N,N-dimethyl-1,3-propanediamine. |
| 6-(o-bromophenoxy)-m-anisidine. | 3-chloro-N,N-dimethyl-propylamine. | N'-[2-(o-bromophenoxy)-5-methoxyphenyl]-N,N-dimethyl-1,3-propanediamine. |
| 6-(o-bromophenoxy)-m-toluidine. | 3-chloro-N,N-dimethyl-propylamine. | N'-[6-(o-bromophenoxy)-m-tolyl]-N,N-dimethyl-1,3-propanediamine. |
| 6-(o-bromophenoxy)-α,α,α-trifluoro-m-toluidine. | 3-chloro-N,N-dimethyl-propylamine. | N'-[6-(o-bromophenoxy)-α,α,α-trifluoro-m-tolyl]-N,N-dimethyl-1,3-propanediamine. |
| 6-(o-bromophenoxy)-α,α,α-trifluoro-m-toluidine. | 1-(3-chloropropyl)-4-methyl-piperazine. | 1-{3-[6-(o-bromophenoxy)-α,α,α-trifluoro-m-toluidino]propyl}-4-methylpiperazine. |
| 2-(o-bromophenoxy)-5-chloroaniline. | 4-(2-chloroethyl)-morpholine. | 4-{2-[2-(o-bromophenoxy)-5-chloroanilino]ethyl}-morpholine. |
| 2-(o-bromophenoxy)-5-chloroaniline. | 3-chloro-N,N-2-trimethyl-propylamine. | N'-[2-(o-bromophenoxy)-5-chlorophenyl]-N,N-2-trimethyl-1,3-propanediamine. |
| 6-(o-bromophenoxy)-m-anisidine. | N-(3-chloropropyl)-dibutylamine. | N'-[2-(o-bromophenoxy)-5-methoxyphenyl]-N,N-dibutyl-1,3-propanediamine. |

A mixture of 66.0 g. (0.22 mole) of 2-(o-bromophenoxy)-5-chloroaniline and 10.8 g. (0.25 mole) of sodium amide (90% technical, in mineral oil) in 400 ml. of anhydrous benzene is refluxed with vigorous stirring for 2.5 hours. A solution of 30.4 g. (0.25 mole) of 3-chloro-N,N-dimethylpropylamine in 100 ml. of anhydrous benzene is added dropwise and refluxing is continued for 18 hours. The cooled reaction mixture is filtered to remove the precipitated inorganic salts. The filtrate is evaporated to dryness, the residue is dissolved in ether, and the solution is extracted with 400 ml. of 1 N-hydrochloric acid. The aqueous acidic extract is neutralized with an excess of potassium carbonate and extracted with ether. The ethereal extracts are combined, dried over anhydrous magnesium sulfate, and evaporated to dryness. The product, N' - [2 - (o-bromophenoxy)-5-chlorophenyl]-N,N-dimethyl-1,3-propanediamine, is obtained by distillation under reduced pressure. The dihydrochloride precipitates from a solution of alcohol and ether on treatment of the base with two equivalents of alcoholic hydrogen chloride.

The procedure of the above example is repeated using stoichiometric amounts of other reactants. The reactants and products appear in the table above.

*Example 4.—2-[o-halo-N-(3-disubstituted-aminopropyl) anilino]phenols*

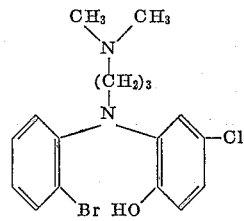

A mixture of 11.2 g. (0.0292 mole) of N'-[2-(o-bromophenoxy) - 5 - chlorophenyl] - N,N-dimethyl-1,3-propanediamine and 1.26 g. (0.0292 mole) of sodium amide (90% technical, in mineral oil) in 125 ml. of anhydrous benzene is heated under reflux for 18 hours. The cooled reaction mixture is filtered, and the crude product (insoluble fraction) saved. The filtrate is evaporated to dryness and the residue triturated with cold ether. The solid product so obtained is pooled with the crude product and suspended in 100 ml. of water, stirred for 15 minutes, and collected by filtration. Recrystallization of the precipitate from ethanol, 10.1 g. (90% yield) gives 2-[o-bromo-N-(3-dimethylaminopropyl)anilino]-4-chlorophenol. When the crude product, described above, is recrystallized from anhydrous ethanol without triturating with water, the sodium salt is obtained.

The procedure of the above example is repeated with stoichiometric amounts of other reactants. The reactants and products are shown in the following table:

TABLE IV

| Starting Materials | Products |
| --- | --- |
| N-[6-(o-bromophenoxy)-α,α,α-trifluoro-m-tolyl]-N,N-dimethyl-1,3-propanediamine. | 2-[o-bromo-N-(3-dimethylaminopropyl)anilino]-α,α,α-trifluoro-p-cresol. |
| N'-[2-(o-bromophenoxy)-5-methoxyphenyl]-N,N-dimethyl-1,3-propanediamine. | 2-[o-bromo-N-(3-dimethylaminopropyl)anilino]-4-methoxyphenol. |
| N'-[o-(2,4-dibromophenoxy)-phenyl]-N,N-dimethyl-1,3-propanediamine. | 2-[2,4-dibromo-N-(3-dimethylaminopropyl)-anilino]phenol. |
| N'-[6-(o-bromophenoxy)m-tolyl]-N,N-dimethyl-1,3-propanediamine. | 2-[o-bromo-N-(3-dimethylaminopropyl)anilino]-p-cresol. |
| N'-[2-(o-bromophenoxy)-4-chlorophenyl]-N,N-dimethyl-1,3-propanediamine. | 2-[o-bromo-N-(3-dimethylaminopropyl)anilino]-5-chlorophenol. |
| 1-{3-[6-(o-bromophenoxy)-α,α,α-trifluoro-m-toluidino]propyl}-4-methylpiperazine. | 2-{o-bromo-N-[3-(4-methyl-1-piperazinyl)-propyl]anilino}-α,α,α-trifluoro-p-cresol. |
| 1-{3-[2-(o-bromophenoxy)-5-methoxyanilino]-propyl}-4-methylpiperazine. | 2-{o-bromo-N-[3-(4-methyl-1-piperazinyl)-propyl]anilino}-4-methoxyphenol. |
| 4-{2-[2-(o-bromophenoxy)-5-chloroanilino]-ethyl}morpholine. | 2-[o-bromo-N-(2-morpholinoethyl-anilino]-4-chlorophenol. |
| N'-[2-(o-bromophenoxy)-5-chlorophenyl]-N,N,2-trimethyl-1,3-propanediamine. | 2-[o-bromo-N-(3-dimethylamino-2-methylpropyl)-anilino]-4-chlorophenol. |
| N'-[2-(o-bromophenoxy)-5-methoxyphenyl]-N,N-dibutyl-1,3-propanediamine. | 2-[o-bromo-N-(3-dibutylaminopropyl)anilino]-4-methoxyphenol. |

*Example 5*

The product of Example 4 is produced in excellent yield by the method of Example 3 according to the following process in which the amount of sodamide used is at least twice stoichiometric.

36.2 g. (0.121 mole) of 2-(o-bromophenoxy)-5-chloroaniline and 21.0 g. (0.485 mole) of sodium amide (90% technical, in mineral oil) in 350 ml. of anhydrous benzene is reacted with 14.7 g. (0.121 mole) of 3-chloro-N,N-dimethylpropylamine in 75 ml. of anhydrous benzene as described in Example 3. The insoluble reaction product, as the free phenolic derivative 2-[o-bromo-N-(3-dimethylaminopropyl)anilino]-4-chlorophenol, is obtained in 82.5% yield and is purified as described in Example 4. Analytically pure material is obtained after one recrystallization from alcohol without a substantial change in melting point.

The above procedure is repeated with stoichiometric quantities of other reagents. The reagents and the products obtained are shown in the following table:

TABLE V

| Starting Materials | | Products |
| --- | --- | --- |
| 2-(o-bromophenoxy)-5-chloroaniline. | 1-(3-chloropropyl)-4-methylpiperazine. | 2-{o-bromo-N-[3-(4-methyl-1-piperazinyl)-propyl]-anilino}-4-chlorophenol. |
| 2-(o-bromophenoxy)-4-chloroaniline. | 3-chloro-N,N-dimethyl-propylamine. | 2-[o-bromo-N-(3-dimethylaminopropyl)-anilino]-5-chlorophenol. |
| o-(2,4-dibromophenoxy)-aniline. | 3-chloro-N,N-dimethyl-propylamine. | 2-[2,4-dibromo-N-(3-dimethylaminopropyl)-anilino]-phenol. |
| 6-(o-bromophenoxy)-m-anisidine. | 3-chloro-N,N-dimethyl-propylamine. | 2-[o-bromo-N-(3-dimethylaminopropyl)-anilino]-4-methoxyphenol. |
| 6-(o-bromophenoxy)-m-toluidine. | 3-chloro-N,N-dimethyl-propylamine. | 2-[o-bromo-N-(3-dimethylaminopropyl)-anilino]-p-cresol. |
| 6-(o-bromophenoxy)-α,α,α-trifluoro-m-toluidine. | 3-chloro-N,N-dimethyl-propylamine. | 2-[o-bromo-N-(3-dimethylaminopropyl)-anilino]-α,α,α-trifluoro-p-cresol. |
| 6-(o-bromophenoxy)-α,α,α-trifluoro-m-toluidine. | 1-(3-chloropropyl)-4-methylpiperazine. | 2-{o-bromo-N-[3-(4-methyl-1-piperazinyl)-propyl]-anilino}-α,α,α-trifluoro-p-cresol. |

*Example 6.—10-(3-disubstituted-aminopropyl)phenoxazines*

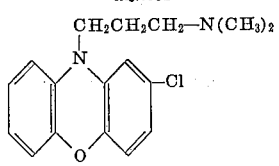

A mixture of 9.6 g. (0.025 mole) of 2-[o-bromo-N-(3-dimethylaminopropyl)anilino]-4-chlorophenol, 4.6 g. (0.033 mole) of potassium carbonate and 1.0 g. of copper powder in 100 ml. of N,N-dimethylformamide is heated under reflux for 48 hours. The cooled reaction mixture is filtered and the filtrate is evaporated to dryness under vacuum. The residue, 8.5 g., is dissolved in 100 ml. of ether, washed with water, and dried over anhydrous magnesium sulfate. Evaporation of the ethereal solution affords 7.0 g. (92% yield) of substantially pure free base to give 81% yield of the hydrochloride after two recrystallizations from alcohol-ether. An alternate method of purification is to treat the filtered reaction mixture with a large excess of water, followed by extraction with ether. The ethereal extract is dried, evaporated to dryness, and the residue is then converted directly to the hydrochloride salt.

The above procedure is repeated with stoichiometric amounts of other starting materials. The starting materials and products so obtained are shown in the following table:

TABLE VI

| Starting Materials | Products |
| --- | --- |
| 2-[o-bromo-N-(3-dimethylaminopropyl)anilino]-4-methoxyphenol. | 10-(3-dimethylaminopropyl)-2-methoxyphenoxazine. |
| 2-{o-bromo-N-[3-(4-methyl-1-piperazinyl)-propyl]anilino}-4-methoxyphenol. | 2-methoxy-10-[3-(4-methyl-1-piperazinyl)propyl]phenoxazine. |
| 2-[o-bromo-N-(3-dimethylaminopropyl)anilino]-6-chlorophenol. | 4-chloro-10-(3-dimethylaminopropyl)-phenoxazine. |
| 2-{o-bromo-N-[3-(4-methyl-1-piperazinyl)-propyl]anilino}-4-chlorophenol. | 2-chloro-10-[3-(4-methyl-1-piperazinyl)-propyl]phenoxazine. |
| 2-[o-bromo-N-(3-dimethylaminopropyl)anilino]-p-cresol. | 10-(3-dimethylaminopropyl)-2-methyl-phenoxazine. |
| 2-[o-bromo-N-(3-dimethylaminopropyl)anilino]-α,α,α-trifluoro-p-cresol. | 10-(3-dimethylaminopropyl)-2-trifluoromethylphenoxazine. |
| 2-{o-bromo-N-[3-(4-methyl-1-piperazinyl)-propyl]anilino}-α,α,α-trifluoro-p-cresol. | 2-trifluoromethyl-10-[3-(4-methyl-1-piperazinyl)propyl]phenoxazine. |

What is claimed is:

1. The process of preparing compounds of the formula:

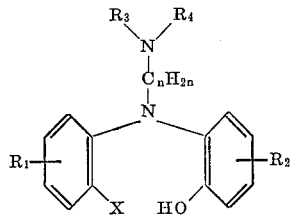

wherein $R_1$ and $R_2$ are each selected from the group consisting of hydrogen, halogen, lower alkyl, lower alkoxy and trifluoromethyl with the proviso that $R_1$ and $R_2$ may not both be hydrogen,

is selected from the group consisting of di(lower alkyl)-amino, morpholino and N-lower alkylpiperazino, X is halogen, and $n$ is an integer greater than 1 and less than 5; which comprises heating in an inert solvent at a temperature of from about 25° C. to about 150° C. a compound of the formula:

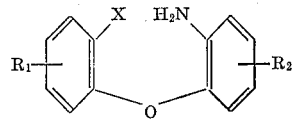

wherein $R_1$, $R_2$ and X are as hereinabove defined, with a compound of the formula:

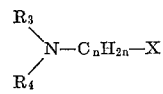

wherein $n$,

and X are as hereinabove defined, in the presence of at least about two molar equivalents of a nitrogen anion forming reagent selected from the group consisting of alkali metal amides, alkali metal hydrides and metalloorganic compounds.

2. The process of preparing compounds of the formula:

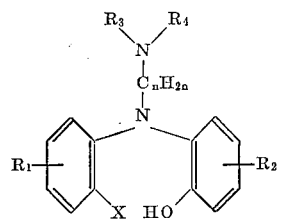

wherein $R_1$ and $R_2$ are each selected from the group consisting of hydrogen, halogen, lower alkyl, lower alkoxy and trifluoromethyl with the proviso that $R_1$ and $R_2$ may not both be hydrogen,

is selected from the group consisting of di(lower alkyl)-amino, morpholino and N-lower alkylpiperazino, X is halogen, and $n$ is an integer greater than 1 and less than 5; which comprises heating in an inert organic solvent at a temperature of from about 25° C. to about 150° C. a compound of the formula:

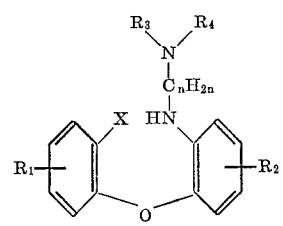

wherein $R_1$, $R_2$,

X and $n$ are as hereinabove defined, in the presence of at least about one molar equivalent of a nitrogen anion forming reagent selected from the group consisting of alkali metal amides, alkali metal hydrides and metalloorganic compounds.

3. The process of preparing compounds of the formula:

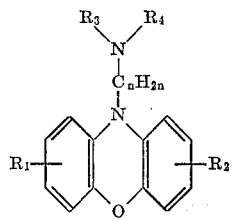

wherein $R_1$ and $R_2$ are each selected from the group consisting of hydrogen, halogen, lower alkyl, lower alkoxy and trifluoromethyl with the proviso that $R_1$ and $R_2$ may not both be hydrogen,

is selected from the group consisting of di(lower alkyl)-amino, morpholino and N-lower alkylpiperazino, and $n$ is an integer greater than 1 and less than 5; which comprises heating in an inert organic solvent at a temperature of from about 25° C. to about 150° C. a compound of the formula:

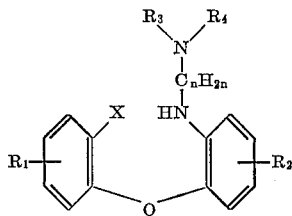

wherein $R_1$, $R_2$,

and $n$ are as hereinabove defined and X is halogen, in the presence of at least about 1 molar equivalent of a nitrogen anion forming reagent selected from the group consisting of alkali metal amides, alkali metal hydrides and metalo-organic compounds; and heating the 2-[o-halo-N-(disubstituted-aminoalkyl)anilino]phenol so obtained in an inert organic solvent at a temperature of from about 125° C. to about 200° C. with a phenolic salt forming reagent selected from the group consisting of alkali metal carbonates and alkaline earth metal carbonates.

References Cited by the Examiner
UNITED STATES PATENTS 2,769,002 10/56 Buisson et al.
2,945,031 7/60 Gordon _____ 260—243
2,947,747 8/60 Craig _____ 260—244

FOREIGN PATENTS 201,628 10/55 Australia.
231,954 2/59 Australia.

OTHER REFERENCES

Brady et al., J. Chem. Soc., pages 1218–22 (1930).
Rodd, "Chemistry of Carbon Compounds," volume IVc, pages 1494–6 (1960).

WALTER A. MONDANCE, *Primary Examiner.*

DUVAL T. McCUTCHEN, IRVING MARCUS,
*Examiners.*